(12) United States Patent
Flammer, III

(10) Patent No.: US 9,307,558 B2
(45) Date of Patent: Apr. 5, 2016

(54) SYSTEM AND METHOD FOR OPTIMAL LISTEN BEFORE TRANSMIT IN WIRELESS COMMUNICATIONS

(71) Applicant: SILVER SPRING NETWORKS, INC., Redwood City, CA (US)

(72) Inventor: George H. Flammer, III, Cupertino, CA (US)

(73) Assignee: Silver Spring Networks, Inc., Redwood City, CA (US)

(*) Notice: Subject to any disclaimer, the term of this patent is extended or adjusted under 35 U.S.C. 154(b) by 42 days.

(21) Appl. No.: 14/142,431

(22) Filed: Dec. 27, 2013

(65) Prior Publication Data

US 2015/0189676 A1 Jul. 2, 2015

Related U.S. Application Data

(63) Continuation of application No. 13/335,841, filed on Dec. 22, 2011, now Pat. No. 8,619,805.

(51) Int. Cl.
| | | |
|---|---|---|
| *H04J 3/00* | (2006.01) | |
| *H04W 74/08* | (2009.01) | |
| *H04W 72/02* | (2009.01) | |
| *H04W 16/14* | (2009.01) | |
| *H04W 84/18* | (2009.01) | |

(52) U.S. Cl.
CPC .......... *H04W 74/0816* (2013.01); *H04W 72/02* (2013.01); *H04W 74/0808* (2013.01); *H04W 16/14* (2013.01); *H04W 84/18* (2013.01)

(58) Field of Classification Search
CPC .................................................... H04L 12/413
USPC ......................................................... 370/337
See application file for complete search history.

(56) References Cited

U.S. PATENT DOCUMENTS

| | | | |
|---|---|---|---|
| 8,421,588 B1* | 4/2013 | Ross et al. ...................... 340/5.1 |
| 2007/0014231 A1* | 1/2007 | Sivakumar et al. ........... 370/216 |
| 2007/0069859 A1 | 3/2007 | Bae et al. | |
| 2010/0074176 A1 | 3/2010 | Flammer, III et al. | |
| 2010/0255801 A1 | 10/2010 | Gunasekara et al. | |
| 2013/0003573 A1* | 1/2013 | Reznik et al. .................. 370/252 |

OTHER PUBLICATIONS

International Search Report and Written Opinion for Application No. PCT/US2012/071066 dated Apr. 29, 2013.
Jain, et al., "A Multichannel CSMA MAC Protocol with Receiver-Based Channel Selection for Multihop Wireless Networks", Computer Communications and Networks, 2001, pp. 432-439.
Nasipuri et al., "A Multichannel CSMA MAC Protocol for Multihop Wireless Networks", Wireless Communications and Networking Conference, WCNC, IEEE, 1999, vol. 3, pp. 1402-1406.
Nasipuri et al., "Multichannel CSMA with Signal Power-Based Channel Selection for Multihop Wireless Networks", Vehicular Technology Conference, IEEE-VTS Fall VTC, 2000 52nd, vol. 1, pp. 211-218.
Sum et al., "Coexistence of Homogenous and Heterogenous Systems for IEEE 802.15.4g Smart Utility Networks", New Frontiers in Dymanic Spectrum Access Networks (DySPAN), IEEE, May 3-6, 2011, pp. 510-520.

* cited by examiner

*Primary Examiner* — Wei Zhao
(74) *Attorney, Agent, or Firm* — Artegis Law Group, LLP

(57) ABSTRACT

One embodiment of the present invention sets forth a technique for transmitting data in a listen before talk (LBT) wireless transmission regime. A digital radio receiver is configured to simultaneously receive and decode digital data transmissions from multiple radio channels. A digital radio transmitter is configured to listen to the multiple radio channels prior to transmitting digital data on a selected one of the multiple channels, based on locally determined channel occupancy. Optimal LBT efficiency is achieved within the set of multiple channels, thereby improving overall transmission efficiency between the transmitter and the receiver.

20 Claims, 7 Drawing Sheets

SYSTEM AND METHOD FOR OPTIMAL LISTEN BEFORE TRANSMIT IN WIRELESS COMMUNICATIONS

CROSS-REFERENCE TO RELATED APPLICATIONS

This application is a continuation of the co-pending U.S. patent application having Ser. No. 13/335,841, filed Dec. 22, 2011, entitled "SYSTEM AND METHOD FOR OPTIMAL LISTEN BEFORE TRANSMIT IN WIRELESS COMMUNICATIONS," which is hereby incorporated herein by reference.

BACKGROUND

1. Technical Field

Embodiments of the present invention relate generally to wireless digital communication systems and methods and, more specifically, to a system and method for optimal listen before transmit in wireless communications.

2. Description of the Related Art

A conventional wireless digital communication system includes at least two nodes, each incorporating a digital radio transceiver. Each node may transmit a data payload to another node via the digital radio transceiver. Certain wireless digital communications systems are required to implement a listen before transmit protocol, whereby a node must listen for energy on a selected channel prior to transmitting on the selected channel. One goal of a listen before transmit protocol is to avoid interference among nodes that are attempting to transmit on the same channel. In many normal operating scenarios, a typical listen before transmit protocol provides adequate statistical arbitration to enable multiple nodes that are competing to transmit on a given channel to eventually transmit data payloads on the channel. In such scenarios, each node is well-behaved and yields the channel to other nodes, which are then able to transmit respective data payloads.

Different types of nodes may share a common channel, but may implement different, unfamiliar modulation and coding schemes, introducing the possibility of a transmission from one node being indistinguishable from radio frequency interference (RFI) to another node. To overcome this ambiguity, listen before transmit protocols typically characterize channel occupancy based only on measured energy within the channel. Unfortunately, this definition for channel occupancy allows an arbitrary RFI source to disable a node from ever transmitting on the channel. For example, certain electromechanical machines, such as commutating electric motors, may emit sufficient RFI energy within the channel to prevent a nearby node from ever transmitting within the channel.

In certain common scenarios, a target node is located close to a localized RFI source, while a source node that is attempting to communicate with the target node is located a significant distance from any localized RFI source. The source node may transmit a data payload to the target node via the selected channel and wait for an acknowledgement on the channel from the target node before proceeding. Even if the target node successfully receives the data payload, localized energy from the RFI source within the channel may prevent the target node from transmitting an acknowledgment receipt of the data payload. In such scenarios, the localized RFI source may render conventional listen before transmit protocols inoperable.

As the foregoing illustrates, what is needed in the art is a more robust technique for implementing a listen before transmit protocol in wireless digital communication systems.

SUMMARY

One embodiment of the present invention sets forth a method for transmitting one or more data packets via a radio signal, the method comprising assessing channel occupancy information based on sampled and quantified energy measured for each channel within a range of frequencies, identifying a first clear channel in the set of channels based on the channel occupancy information, determining that a data transmission operation is permitted via the first clear channel, configuring a transmitter circuit to transmit a first data packet via the first clear channel using a first modulation technique to modulate sequential bits from the first data packet based on one or more characteristics of the first clear channel, and transmitting the first data packet via the first clear channel to a first target node.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
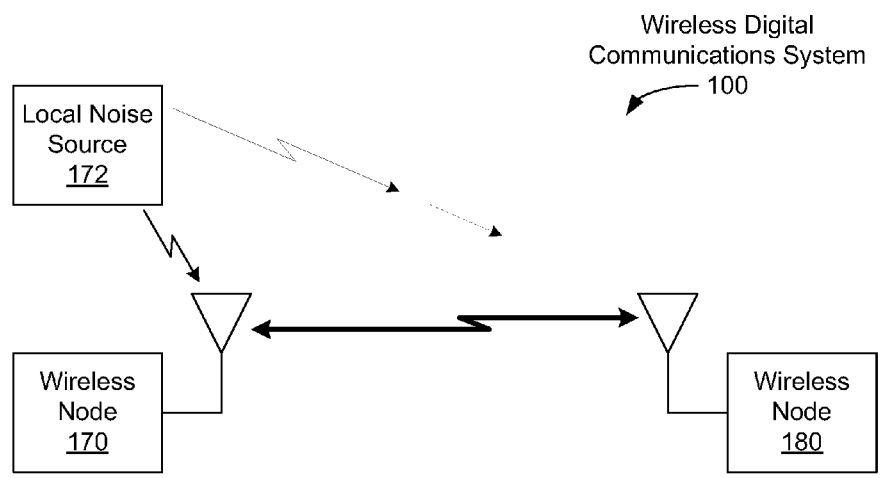
FIG. 1A illustrates a wireless digital communications system comprising two nodes configured to implement one or more aspect of the present invention.

FIG. 1A illustrates a wireless digital communications system 100 comprising two wireless nodes 170, 180 configured to implement one or more aspect of the present invention. The wireless node 170 is configured to perform bidirectional digital data communications with wireless node 180. The two wireless nodes 170, 180 implement a listen before transmit (LBT) protocol, whereby each node first listens for energy on a candidate transmission channel prior to transmitting data on the candidate channel. In one embodiment, listening for energy within a candidate channel involves measuring total energy within the channel for a specified duration of measurement time, referred to as a channel dead time. If the measured total energy over the measurement time exceeds a channel occupancy energy threshold, then the channel is considered to be occupied and transmission is disallowed. Alternatively, if the total energy is below the channel occupancy energy threshold, then the channel is considered to be unoccupied (clear) and transmission is allowed.

In this scenario, a local noise source 172 is positioned relatively close to wireless node 170. As illustrated below in FIG. 1B, the local noise source 172 generates radio frequency interference (RFI) at energy levels exceeding the channel occupancy energy threshold for RFI-occupied channels as measured by wireless node 170, but not as measured by wireless node 180. This localized RFI prevents wireless node 170 from transmitting on the RFI-occupied channels, however wireless node 180 is still free to transmit on these channels. During the course of normal operation, a data transmission may be initiated by wireless node 180 on an RFI-occupied channel. The transmission signal from wireless node 180 may easily overcome the localized RFI, allowing wireless node 170 to properly receive a payload of data. However, wireless node 170 may need to acknowledge receipt on a different channel that is not occupied by the localized RFI in order to abide by prevailing LBT rules. Embodiments of the present invention contemplate wireless nodes configured to simultaneously receive data on a plurality of channels, simultaneously listen to a plurality of channels, and selectively transmit on at least one unoccupied channel. This technique of simultaneously monitoring multiple channels for selecting a transmission channel within an LBT regime is referred to herein as multi-channel LBT.

Figure 1B:
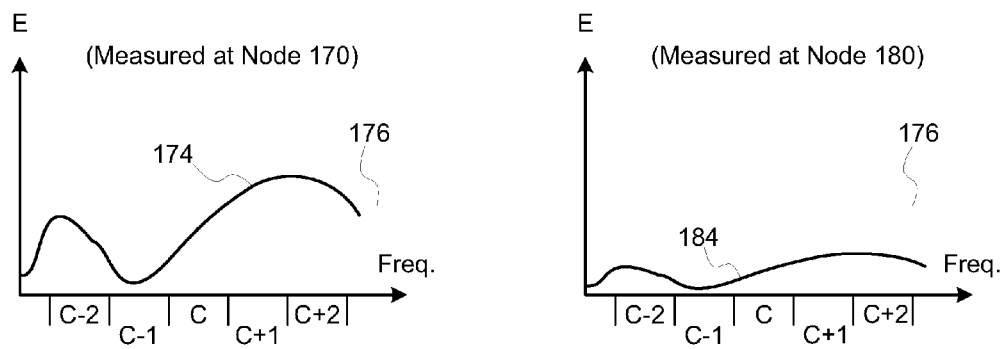
FIG. 1B illustrates exemplary spectral noise profiles for a local noise source with respect to a channel occupancy energy threshold.

FIG. 1B illustrates exemplary spectral noise profiles 174, 184 for the local noise source 172 with respect to a channel occupancy energy threshold 176. A portion of radio frequency spectrum is organized as channels C−2, C−1, C, C+1, C+2, which wireless nodes 170 and 180 are configured to use for transmitting data. For a channel to be considered unoccupied and available for transmission, measured energy within the channel must be below the channel occupancy energy threshold 176.

In this scenario, when wireless node 170 measures energy in channels C−2, C−1, C, C+1, and C+2, channels C+1 and C+2 are determined to be occupied, while channels C−2, C−1, and C are determined to be unoccupied. The fact that channels C+1 and C+2 are determined to be occupied because of RFI is immaterial; transmission is still disallowed on these channels. By contrast, when wireless node 180 measures energy in channels C−2, C−1, C, C+1, and C+2, the channels are all determined to be unoccupied and available for transmission. As shown, the spectral noise profile 184, measured at wireless node 180, for the local noise source 172 is significantly attenuated with respect to local noise profile 174. In this case, attenuation is simply due to distance from the local noise source 172.

Figure 1C:
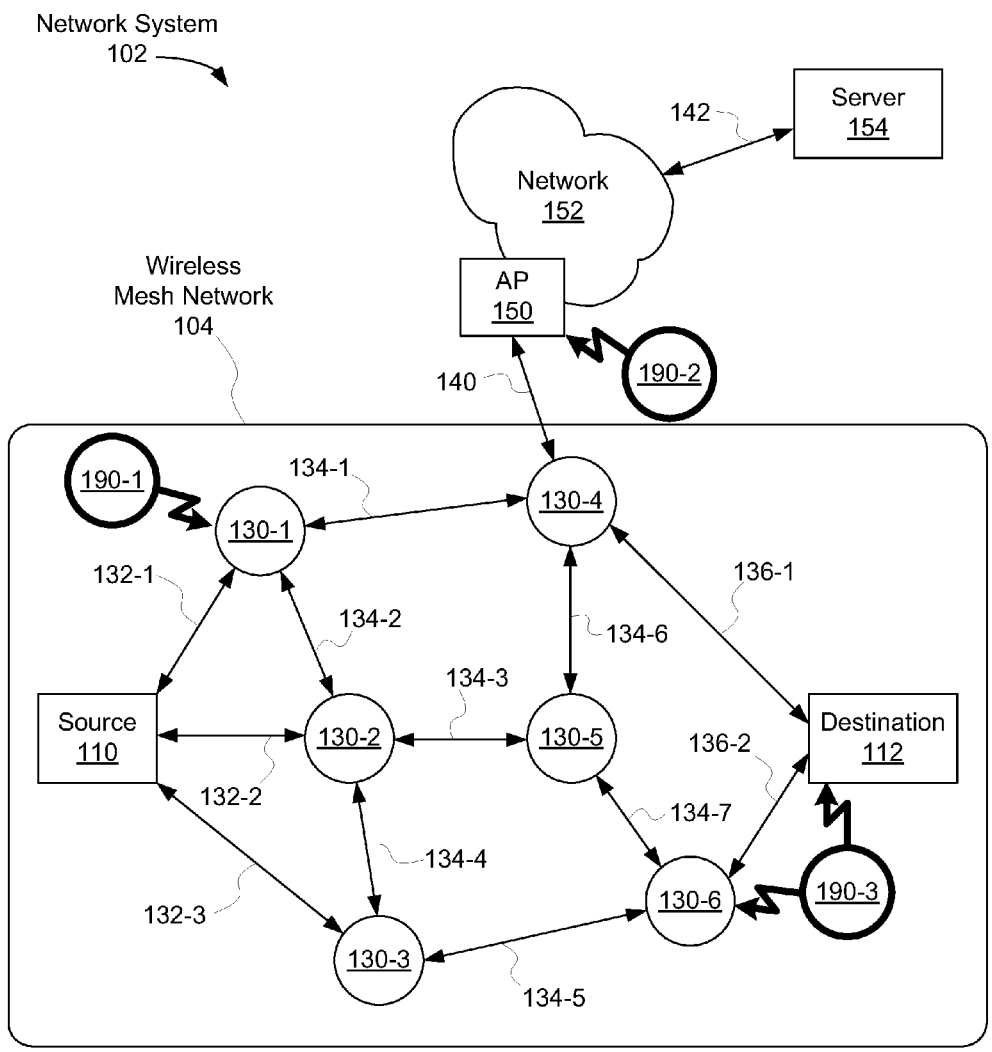
FIG. 1C illustrates a network system, configured to implement one or more aspects of the present invention.

FIG. 1C illustrates a network system 102, configured to implement one or more aspects of the present invention. The network system 102 comprises a wireless mesh network 104, which may include a source node 110, intermediate nodes 130 and destination node 112. The source node 110 is able to communicate with certain intermediate nodes 130 via communication links 132. The intermediate nodes 130 communicate among themselves via communication links 134. The intermediate nodes 130 communicate with the destination node 112 via communication links 136. The network system 102 may also include an access point 150, configured to communicate with at least one node 130 via communications link 140, a network 152, and a server 154.

Any node 110, 112, 130, 150 may initiate a discovery protocol implemented to determine node adjacency to one or more adjacent nodes. For example, intermediate node 130-2 may execute the discovery protocol to determine that nodes 110, 130-1, 130-3, and 130-5 are adjacent to node 130-2. Furthermore, this node adjacency indicates that communication links 132-2, 134-2, 134-4 and 134-3 may be established between the nodes 110, 130-1, 130-3, and 130-5, respectively. Any technically feasible discovery protocol may be implemented without departing the scope and spirit of embodiments of the present invention.

Once adjacency is established between the source node 110 and at least one intermediate node 130, the source node 110 may generate payload data for delivery to the destination node 112, when a path is available. The payload data may comprise an Internet protocol (IP) packet, an Ethernet frame, or any other technically feasible unit of data. Similarly, any technically feasible addressing and forwarding techniques may be implemented to facilitate delivery of the payload data from the source node 110 to the destination node 112. For example, the payload data may include a header field configured to include a destination address, such as an IP address or Ethernet media access control (MAC) address. Each intermediate node 130 may be configured to forward the payload data based on the destination address. Alternatively, the payload data may include a header field configured to include at least one switch label to define a predetermined path from the source node 110 to the destination node 112. A forwarding database may be maintained by each intermediate node 130 that indicates which communication link 132, 134, 136 should be used and in what priority to transmit the payload data for delivery to the destination node 112. The forwarding database may represent multiple paths to the destination address each of the multiple paths may include one or more cost values. Any technically feasible type of cost value may characterize a link or a path within the network system 102. In one embodiment, each node within the wireless mesh network 104 implements substantially identical functionality and each node may act as a source node, destination node or intermediate node.

As shown, the access point 150 is configured to communicate with at least one node within the wireless mesh network 104, such as intermediate node 130-4. Communication may include transmission of payload data, timing data, or any other technically relevant data between the access point 150 and the at least one node within the wireless mesh network 104. For example, communications link 140 may be established between the access point 150 and intermediate node 130-4 to facilitate transmission of payload data between wireless mesh network 104 and network 152. The access point 150 is coupled to the network 152, which may comprise any wired, optical, wireless, or hybrid network configured to transmit payload data between the access point 150 and the server 154. In one embodiment, the server 154 represents a destination for payload data originating within the wireless mesh network 104 and a source of payload data destined for one or more nodes within the wireless mesh network 104. In one embodiment, the server 154 executes an application for interacting with nodes within the wireless mesh network 104. For example, nodes within the wireless mesh network 104 may perform measurements to generate measurement data, such as power consumption data. The server 154 may execute an application to collect the measurement data and report the measurement data. In one embodiment, the server 154 queries nodes within the wireless mesh network 104 for certain data. Each queried node replies with requested data, such as consumption data, system status, data regarding proper performance, and so forth. In an alternative embodiment, each node within the wireless mesh network 104 autonomously reports certain data, which is collected by the 154 as the data becomes available via autonomous reporting.

In a practical setting, elements within the network system 102 may be located in proximity to local noise sources 190. For example, intermediate node 130-1 may be located in proximity to local noise source 190-1, and access point 150 may be located in proximity to local noise source 190-2. Local noise source 190-3 may be located in proximity to both intermediate node 130-6 and destination node 112. Each local noise source 190 may generate a unique RFI profile and randomly interfere with different channels. The RFI may be constant, intermittent, and unpredictable.

Figure 2:
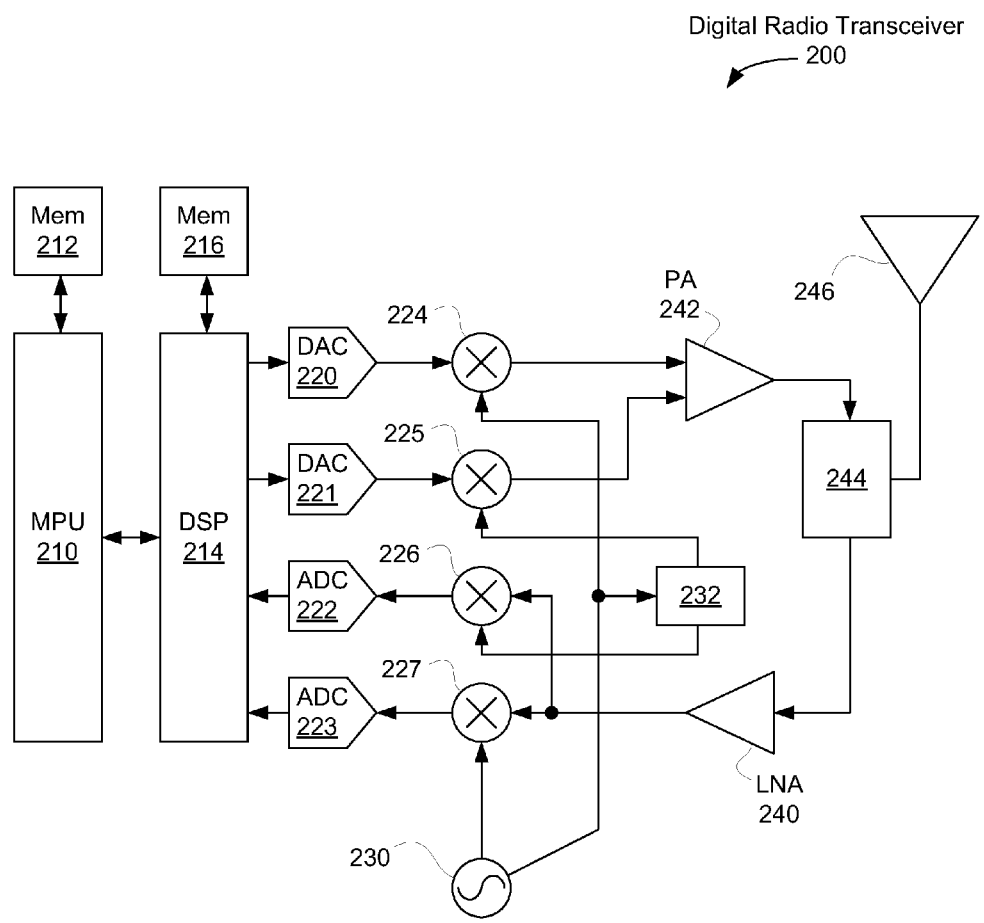
FIG. 2 illustrates a radio transceiver configured to implement multi-channel operation, according to one embodiment of the invention.

FIG. 2 illustrates a digital radio transceiver 200 configured to implement multi-channel operation, according to one embodiment of the invention. Each node 110, 112, 130 within the wireless mesh network 104 of FIG. 1 includes at least one instance of the digital radio transceiver 200. The access point 150 may also include at least one instance of the digital radio receiver 200. The digital radio transceiver 200 may include, without limitation, a microprocessor unit (MPU) 210, a digital signal processor (DSP) 214, digital to analog converters (DACs) 220, 221, analog to digital converters (ADCs) 222, 223, analog mixers 224, 225, 226, 227, a phase shifter 232, an oscillator 230, a power amplifier (PA) 242, a low noise amplifier (LNA) 240, an antenna switch 244, and an antenna 246. A memory 212 may be coupled to the MPU 210 for local program and data storage. Similarly, a memory 216 may be coupled to the DSP 214 for local program and data storage.

In one embodiment, the MPU 210 implements procedures for processing IP packets transmitted or received as payload data by the digital radio transceiver 200. The procedures for processing the IP packets may include, without limitation, wireless routing, encryption, authentication, protocol translation, and routing between and among different wireless and wired network ports. The MPU 210 may also implement a packet transmission protocol, such as a four step transmission protocol discussed in greater detail below in FIG. 4. Alternatively, the DSP 214 may implement the four step transmission protocol.

The DSP 214 implements signal processing procedures for modulating a serialized representation of payload data comprising packets, such as IP packets, for wireless transmission. The serialized representation may encode one or more bits of payload data per modulation symbol. A receiver may demodulate each modulation symbol to recover the one or more bits of payload data. In one embodiment the one or more bits of payload data are used to generate a corresponding IP packet. The DSP 214 may also implement multi-channel modulation for simultaneous transmission of independent units of payload data via multiple, independent channels. Each independent channel occupies a different frequency range in a frequency domain representation of a transmitted radio signal. The DSP 214 also implements signal processing procedures for receiving payload data, such as payload data comprising IP packets. The procedures may include, without limitation, filtering, energy detection, signal characterization, and simultaneous demodulation of multiple, independent channels.

In one embodiment, the DSP 214 is configured to modulate data within a given channel using a particular modulation technique that is selected from a set of different modulation techniques, based on prevailing channel requirements. For a given packet of data, a particular transmission bit rate may be implemented using one of the different modulation techniques based on channel conditions. For example, if a selected channel is subjected to a relatively large amount of noise, then a lower bit rate modulation technique that is more tolerant of noise may be selected. Alternatively, if a selected channel is subjected to relatively low noise and low loss, then a higher bit rate modulation technique may be selected despite a potentially reduced noise tolerance. Exemplary modulation techniques known in the art include, without limitation, frequency shift keying (FSK) and quadrature amplitude modulation (QAM). FSK may be implemented as a robust, but relatively low bit rate technique for representing one or more bits of data per modulation symbol as signal energy in at least one of two or more defined frequency bands. QAM may be implemented as a relatively high bit rate technique for representing a set of two or more bits per modulation symbol within an amplitude-phase space. Each possible value represented by the two or more bits is mapped to a unique region within the amplitude-phase space. A collection of regions within the amplitude-phase space is known as a constellation. During modulation, each set of two or more bits comprising a modulation symbol is encoded and mapped to an appropriate region within a corresponding constellation. Persons skilled in the art will understand that quadrature encoded signal pairs may be used to conveniently implement QAM modulation. Furthermore, any technically feasible modulation, demodulation, filtering, energy detection, and signal characterization techniques may be implemented by the DSP 214 without departing the scope and spirit of embodiments of the present invention.

The DSP 214 is coupled to DAC 220 and DAC 221. Each DAC 220, 221 is configured to convert a stream of outbound digital values into a corresponding analog signal. The outbound digital values are computed by the signal processing procedures for modulating one or more channels. The DSP 214 is also coupled to ADC 222 and ADC 223. Each ADC 222, 223 is configured to sample and quantize an analog signal to generate a stream of inbound digital values. The inbound digital values are processed by the signal processing procedures to demodulate and extract payload data from the inbound digital values.

In one embodiment, the DSP 214 generates two modulated streams of outbound digital values, which are converted to corresponding analog quadrature signals by DACs 220, 221. The analog quadrature signals are separately mixed with a radio frequency (RF) carrier signal by analog mixers 224, 225 to generate corresponding quadrature RF signals, each having a frequency domain image centered about the frequency of the RF carrier signal. Oscillator 230 generates the RF carrier signal and phase shifter 232 generates a 90-degree shifted representation of the RF carrier signal for generating quadrature RF signals. The PA 242 combines the quadrature RF signals to generate a modulated RF signal, which is coupled through the antenna switch 244 to the antenna 246. The antenna 246 converts the modulated RF signal from an electrical representation to an electromagnetic representation for wireless transmission. The wireless transmission may be directed to a different instance of the digital radio transceiver 200, residing within a different node of the wireless mesh network 104.

When the digital radio transceiver 200 is receiving data, the antenna 246 converts an incoming electromagnetic RF signal to an electrical RF signal, which is coupled through the antenna switch 244 to the LNA 240. The LNA 240 amplifies the electrical RF signal and couples the amplified RF signal to analog mixers 226 and 227. The amplified RF signal is characterized as having a signal image centered about an RF carrier frequency. The analog mixer 227 shifts the signal image down in frequency to an in-phase baseband component of the signal image. The signal is in-phase with respect to the RF carrier signal generated by oscillator 230. The analog mixer 226 shifts the signal image down in frequency to a 90-degree shifted baseband component of the signal image. The in-phase and 90-degree shifted baseband signals comprise a quadrature representation of one or more channels within the electrical RF signal. A plurality of different frequency channels may be represented within the baseband signals. The DSP 214 is configured to map the stream of inbound digital values, comprising a time domain representation of the baseband signals, to a frequency domain representation of the baseband signals. Persons skilled in the art will recognize that the frequency domain representation may be used to efficiently isolate one data bearing signal within one channel from a signal within a different channel. Similarly, the frequency domain representation may be used to detect noise and interfering transmissions within a given channel.

In one embodiment, the oscillator 230 can be programmed to generate one selected frequency from a plurality of possible frequencies. Each of the plurality of frequencies corresponds to a different channel. The selected frequency determines a center channel for a range of channels that are concurrently available to the DSP 214 or receiving or transmitting data. For example, if a frequency range of 5 MHz defines fifty channels, and each channel is allocated a bandwidth of 100 kHz, then the selected frequency determines a center channel for five concurrently available channels that are adjacent in frequency. In this example, a frequency range of 500 kHz from the overall frequency range of 5 Mhz is processed by the DSP 214 for transmitting or receiving data on one or more of the five channels. If the oscillator 230 is programmed to generate a different selected frequency, then a different set of five concurrently available channels may be used for transmitting or receiving data. The center channel may be changed arbitrarily by programming the oscillator 230 independently of the DSP 214 operating on the concurrently available channels. The digital radio transceiver 200 may be configured with an arbitrary number of concurrently available channels, each having an arbitrary bandwidth without departing the scope and spirit of embodiments of the present invention.

Figure 3A:
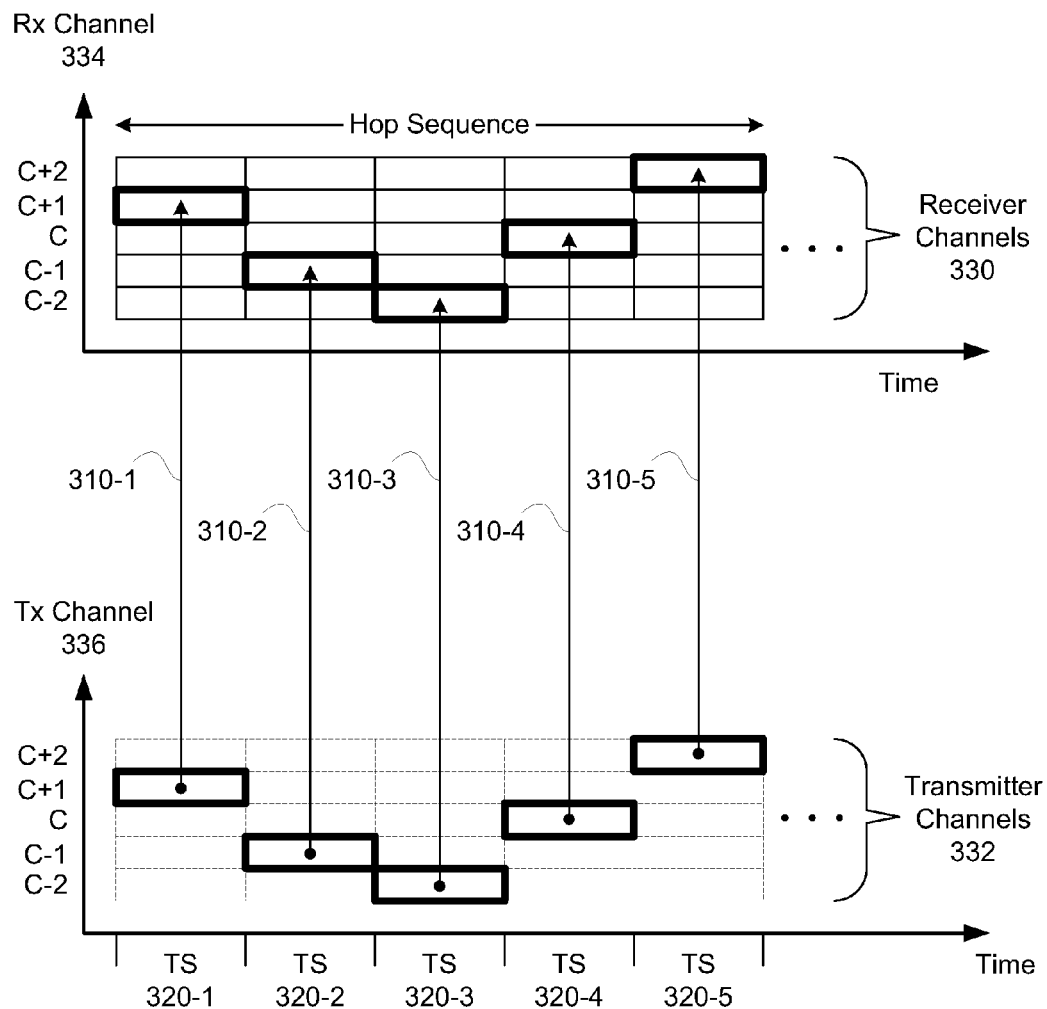
FIG. 3A illustrates a frequency hopping transmission that targets a multi-channel receiver, according to one embodiment of the present invention.

FIG. 3A illustrates a frequency hopping transmission that targets a multi-channel receiver, according to one embodiment of the present invention. A set of five concurrent receiver channels 330 is selected, for example, by programming oscillator 230 of FIG. 2 to establish receiver channel "C" as the center channel for five channels denoted as C−2, C−1, C, C+1, C+2. Similarly, an identical set of five transmitter channels 332 is selected and denoted as C−2, C−1, C, C+1, C+2. The center channel, C, maps to a particular wireless transmission frequency via the frequency of the RF carrier signal generated by oscillator 230.

A first instance of the digital radio transceiver 200 is configured to operate as a transmitter, and a second instance of the digital radio transceiver 200 is configured to operate as a receiver. The transmitter may transmit an RF signal on a particular transmitter channel 336 within a time span (TS) 320. Each time span 320 may be specified as a maximum transmission time, after which the transmitter may hop to a different channel to continue transmitting. In one embodiment, the transmitter is configured to transmit on one channel in any given time span 320. In other embodiments, the transmitter is configured to concurrently transmit on two or more channels in a given time span 320.

The receiver is configured to monitor each receive channel C−2 through C+2 within the set of five concurrent receive channels 330. If a data bearing signal is received on one of the concurrent receive channels 330, the receiver demodulates the signal into a serial data stream. In one embodiment, the serial data stream is parsed and collected into an IP packet, which is processed by the MPU 210. If two or more data bearing signals are received, each on a separate channel, then each one of the two or more data bearing signals is similarly demodulated into an independent serial data stream. In one embodiment, the set of concurrent receive channels 330 is nominally identical to the set of transmitter channels 332. In alternative embodiments, the set of concurrent receive channels 330 may be a superset of the transmitter channels 332.

As shown, the transmitter frequency-hops in a particular channel sequence. In this example, the channel sequence is {C−1, C−1, C−2, C, C−2} in time spans 320-1, 320-2, 320-3, 320-4, and 320-5, respectively. Payload data 310-1, 310-2, 310-3, 310-4, and 310-5 are transmitted in time spans 320-1, 320-2, 320-3, 320-4, and 320-5, respectively. In one embodiment, payload data 310 transmitted in a given time span 320 comprises at least a portion of an IP packet, such as a whole IP packet or an IP packet fragment.

Importantly, because the receiver is always able to capture and demodulate a data bearing signal within the set of concurrent receiver channels 330, hop synchronization with the transmitter is unnecessary. As a consequence, related overhead and transmission inefficiency is eliminated or greatly mitigated. In one embodiment, each communication link 132, 134, 136, 140 of FIG. 1 is established with a persistent center channel during execution of the discover protocol. In alternative embodiments, a center channel is established dynamically in response to prevailing transmission conditions or via a predetermined hop sequence. Persons skilled in the art will recognize that any technically feasible technique may be implemented to establish a consistent center channel C for the transmitter and receiver without departing the scope and spirit of embodiments of the present invention.

Figure 3B:
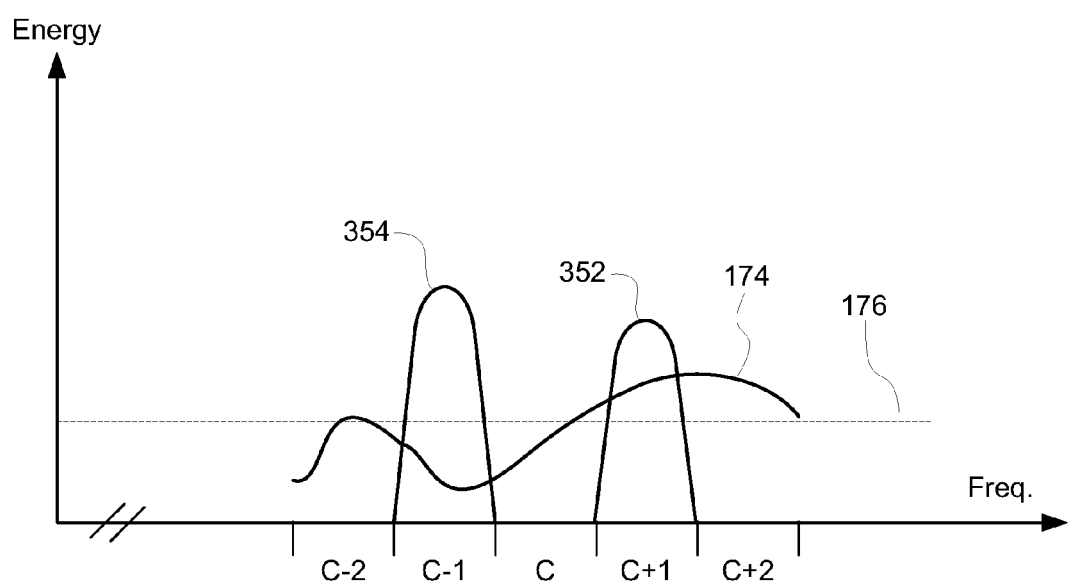
FIG. 3B represents energy within a group of channels, according to one embodiment of the present invention.

FIG. 3B represents energy within a group of channels C−2 through C+2, according to one embodiment of the present invention. The energy is measured at a wireless node operating as a receiver, and may include emissions from other wireless nodes and from RFI noise sources. As shown, measured energy may include RFI associated with spectral noise profile 174, as well as one or more transmission signal 352 from other wireless nodes. In this scenario data is transmitted via transmission signal 352 on channel C+1. The transmission signal 352 includes sufficient energy to overcome RFI associated with spectral noise profile 174. However, the RFI on channel C+1 at the receiver of a given wireless node is above the channel occupancy energy threshold 176, thereby disallowing the wireless node to transmit on channel C+1. The wireless node is therefore unable to use C+1 to transmit an acknowledgement message. In this scenario, the wireless node may acknowledge receipt of data by transmitting an acknowledgement message, depicted as transmission signal 354, on channel C−1, which is not occupied by the RFI.

In one embodiment, at least two instances of the digital radio transceiver 200 configured to communication within the network system 102 implement an LBT protocol. When a current channel within a transmitter hop sequence is determined to be occupied, an alternate channel may instead be selected by the transmitter. In one embodiment, determining channel occupancy is performed by locally measuring energy within each channel and selecting an unoccupied channel for transmission.

In certain scenarios, multiple channels are allocated in sequential ranges of radio frequency spectrum, with a set of channels situated in the lowest and highest frequency ranges designated as being restricted to one maximum transmission power level. Channels above the lowest frequency ranges and below the highest frequency ranges are designed as being restricted to a second, higher transmission power level, and so forth. The highest maximum transmission power level is only permitted on inner channels generally centered within the overall range of spectrum. Furthermore, different channel occupancy energy thresholds 176 may be specified for different channels. Other scenarios involve channel allocation configurations that include contiguous channels distributed over non-contiguous radio frequency spectrum. In each scenario, a channel may only be selected for transmission when a wireless node determines that the channel is unoccupied, based on appropriate restrictions for the channel.

A digital radio transceiver 200 configured to implement multi-channel LBT may use different techniques to select a transmission channel from two or more unoccupied channels. In one embodiment, an unoccupied channel having the lowest power emission restriction is selected. In another embodiment, an unoccupied channel having the highest prior transmission success rate is selected. In yet another embodiment, an unoccupied channel having the highest prior transmission success rate at the lowest power is selected. In certain embodiments, an unoccupied channel having the least measured energy is preferentially selected.

In certain implementations of the digital radio transceiver 200, bit rate and transmission power may be traded off, so that lower bit rate transmissions may be performed at lower power while maintaining similar overall transmission success rates. In one embodiment, the digital radio transceiver 200 is configured to transmit certain messages such as acknowledge messages, at a relatively low power and a relatively low bit rate within an unoccupied channel. In other embodiments, the digital radio transceiver 200 is configured to transmit using a specified lower power and bit rate that meets a transmission success rate threshold. A specified power and bit rate may be determined by successively measuring power and bit rate combinations to a particular wireless node until an optimal combination of power and bit rate is observed to be consistently successful.

The digital radio transceiver 200 may be configured to implement different link-layer transmission protocols, including blind datagram transmission, and confirmed datagram transmission, illustrated below in FIG. 4. Persons skilled in the art will recognize that different transmission techniques and different channel selection techniques may be implemented within a multi-channel LBT regime without departing the scope and spirit of the present invention.

Transmission efficiency is improved by eliminating unnecessary channel blocking, and node synchronization. Additionally, non-deterministic transmission latency may be improved.

Figure 4:
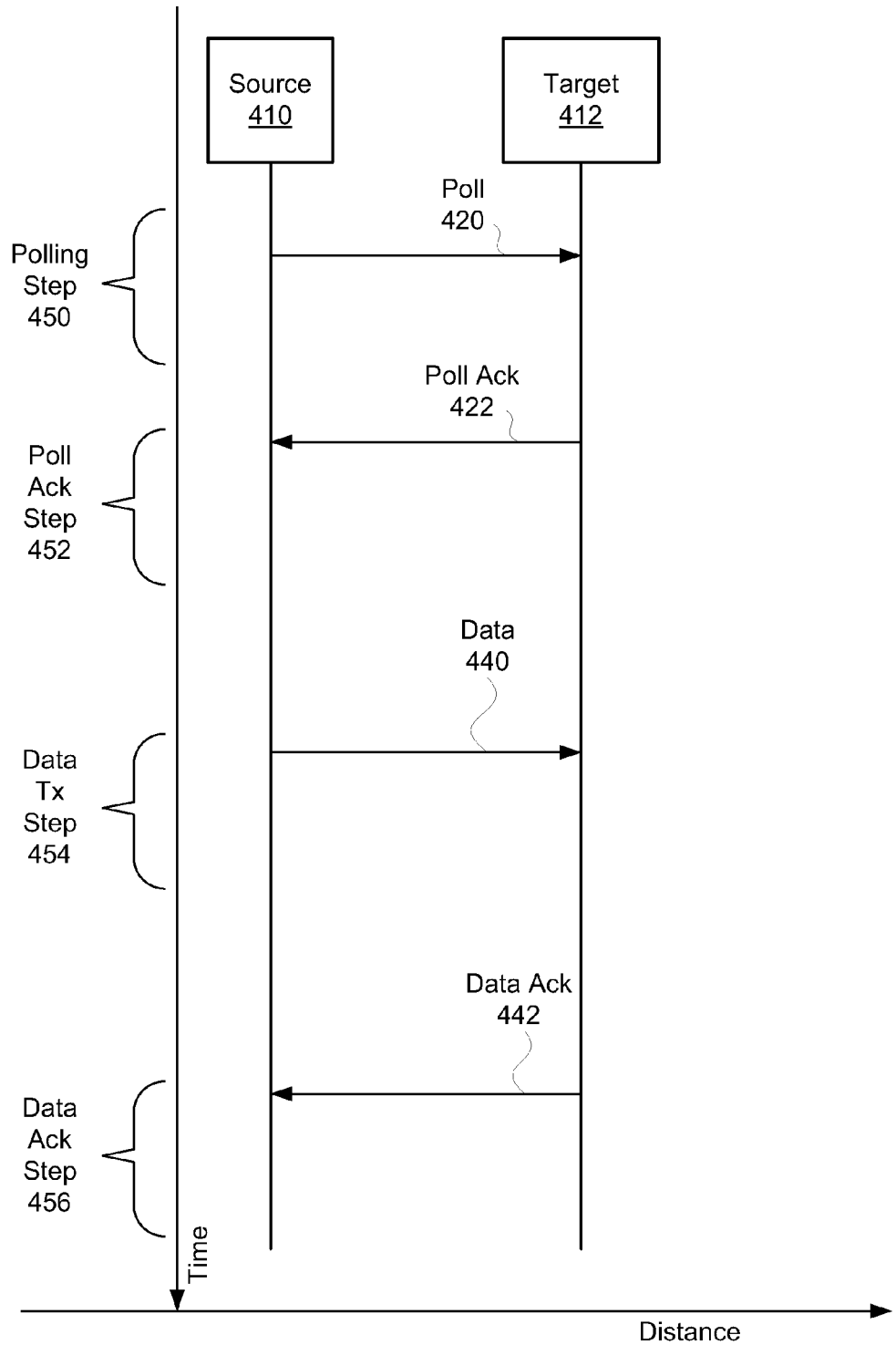
FIG. 4 illustrates a four step communications protocol for transmitting payload data to a single transmission target, according to one embodiment of the present invention.

FIG. 4 illustrates a four step communications protocol for transmitting payload data to a single transmission target, according to one embodiment of the present invention. The communications protocol includes a polling step 450, a poll acknowledgement step 452, a payload data transmission step 454, and a data acknowledgement step 456.

In one embodiment, a source node 410, such as the wireless node 180 of FIG. 1A or the source node 110 of FIG. 1C, is able to transmit payload data to a target node 412, such as the wireless node 170 or the destination node 112, via a first unoccupied channel, and the target node 412 is able to acknowledge the payload data via a second unoccupied channel. The first channel and the second channel may be the same channel or different channels.

During the polling step 450, the source node 410 performs a query to the target node 412 to determine if the target node 412 is able to accept payload data. In one embodiment, the query comprises transmitting a poll message 420 to the target node 412. During the poll acknowledgement step 452, target node 412 responds with a poll acknowledgement message 422. The poll message 420 may be transmitted on one channel that is determined to be unoccupied by the source node 410 and the poll acknowledgement message 422 may be transmitted on the same channel or a different channel that is determined to be unoccupied by the target node 412. In both cases, each channel may be selected according to a multi-channel LBT protocol.

In a data transmission step 454, the source node 410 transmits a data message 440 to the target node 412. In a data acknowledgement step 456, the target node 412 transmits a data acknowledgement message 442 back to the source node 410 to indicate reliable receipt of the data message 440. The data mess 422 may be transmitted on one channel that is determined to be unoccupied by the source node 410 and the data acknowledgement message 442 may be transmitted on the same channel or a different channel that is determined to be unoccupied by the target node 412. In both cases, each channel may be selected according to a multi-channel LBT protocol.

A message may be lost at any step of this four step communications protocol. If such a loss occurs, the transmission is considered to have failed. High level protocols may be used to retry each transmission when a failure occurs. In one embodiment, the digital radio transceiver 200 implements the well-known transmission communication protocol (TCP) and internet protocol (IP) protocols for transmission of IP packets. The IP packets are mapped into an implementation specific transmission format comprising payload data. Other technically feasible transmission protocols may also be implemented without departing the scope and spirit of embodiments of the present invention.

Figure 5:
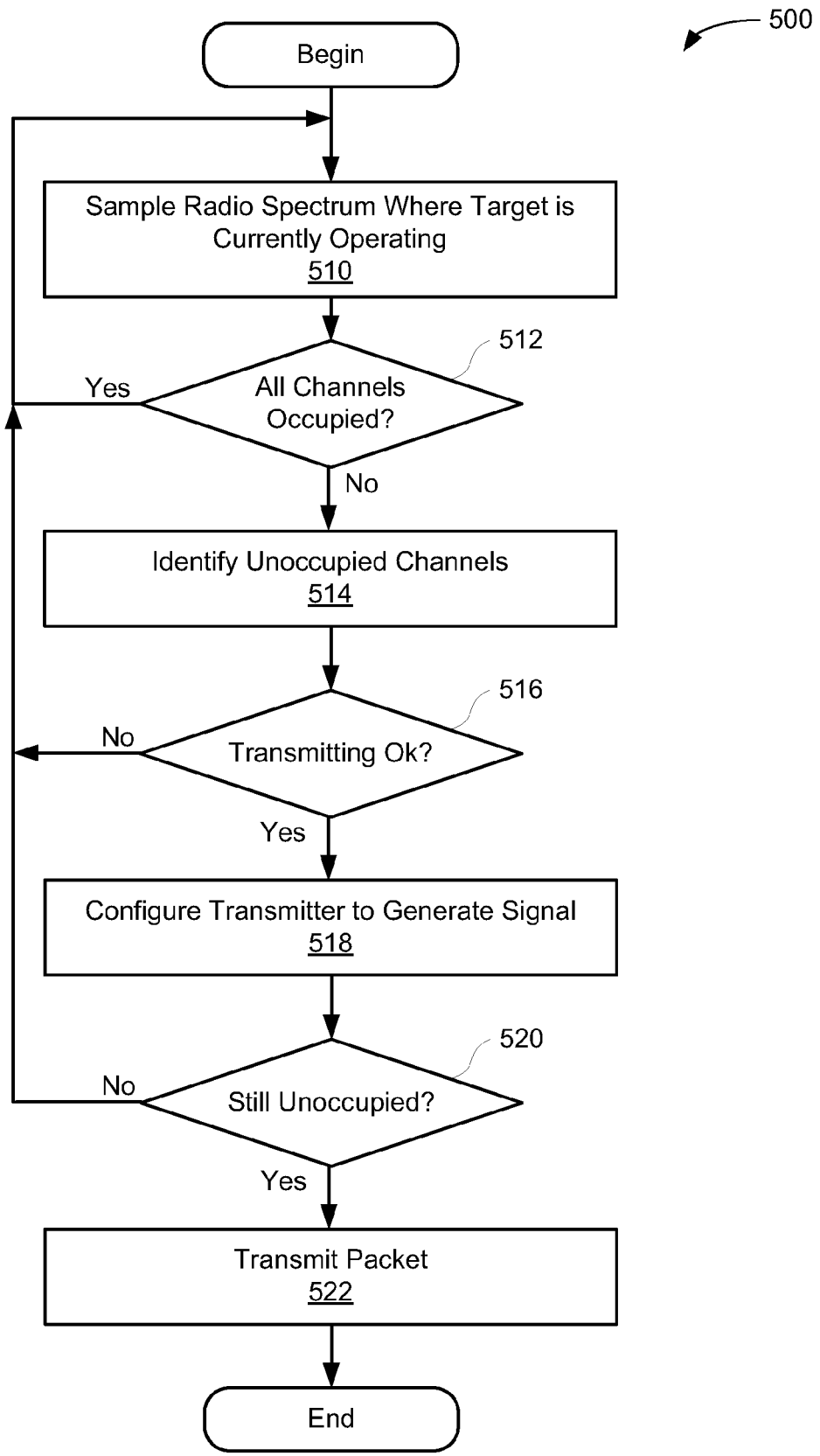
FIG. 5 is a flow diagram of method steps for configuring a radio transmitter to transmit payload data within an unoccupied channel, according to one embodiment of the invention.

FIG. 5 is a flow diagram of method steps 500 for configuring a radio transmitter to transmit payload data within an unoccupied channel, according to one embodiment of the invention. Although the method steps are described in conjunction with the systems of FIGS. 1A, 1C, and 2, persons skilled in the art will understand that any system configured to perform the method steps, in any order, is within the scope of the present invention. This method may be performed by the digital radio transceiver 200 or any technically feasible radio transceiver system.

The method begins in step 510, where the digital radio transceiver samples radio spectrum where a target node is currently operating. In one embodiment, the radio spectrum corresponds to a range of channels, such as concurrent receiver channels C−2 through C+2 of FIG. 3A. Any technically feasible technique may be implemented to sample the radio spectrum. For example, the digital radio transceiver may perform a time domain to frequency domain transform to measure energy in specific frequency domain ranges corresponding to certain specified channels. Alternatively, the digital radio transceiver may perform a set of frequency-selective filtering operations to sample the radio spectrum, whereby energy within each channel is measured by the filtering operations to assess occupancy for each channel. If the amount of energy measured within a given channel is above a predetermined threshold, such as the channel occupancy energy threshold 176, then the channel is deemed to be occupied. However, if the amount of energy measured within a channel is below the predetermined threshold, then the channel is deemed to be unoccupied. In one embodiment, the digital radio transceiver samples radio spectrum using the antenna 246 of FIG. 2, which is also used to transmit data. If, in step 512, all potential channels are not occupied based on the samples taken in step 510, then the method proceeds to step 514, where the digital radio transceiver identifies unoccupied channels for potential transmission.

If, in step 516, transmitting is permitted, then the method proceeds to step 518. Transmission may be permitted or not, for example, based on how long a particular channel has been recently in use by the transmitter or on certain other occupancy rules that may apply. In step 518, the digital radio transceiver is configured to generate a signal for transmission on an unoccupied channel.

If, in step 520, the channel is still unoccupied, then the method proceeds to step 522, where the digital radio transceiver transmits payload data on a selected channel from a set of one or more unoccupied channels. A channel that remains unoccupied after an LBT listening time period has lapsed is considered to be still unoccupied. As discussed previously, if multiple unoccupied channels meet LBT criteria for transmission, then a certain selection preference may be applied in selecting a channel for transmission. For example, an unoccupied channel that will require the least transmission power for a high likelihood of successful message transmission may be selected over other unoccupied channels. The method terminates in step 522.

Returning to step 512, all potential channels are occupied based on the samples taken in step 510, then the method proceeds back to step 510.

Returning to step 516, if transmitting is not permitted on an unoccupied channel, then the method proceeds back to step 510.

Returning to step 520, if none of the unoccupied channels are still unoccupied, then the method proceeds back to step 510.

In sum, a technique is disclosed for implementing an optimal listen before transmit (LBT) protocol within a wireless transceiver comprising a multi-channel receiver and a first transmitter. The multi-channel receiver is configured to listen to multiple channels simultaneously, enabling the receiver to accept and decode incoming data from an arbitrary channel without prior synchronization with a second transmitter. This receiver capability advantageously enables the second transmitter communicating with the multi-channel receiver to transmit on any appropriate and unoccupied channel without prior negotiation with the multi-channel receiver.

One advantage of the disclosed systems and methods is that optimal LBT may be implemented within a wireless communications system, thereby improving communication efficiency.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A method for receiving one or more data packets via a radio signal, the method comprising:
   monitoring a first plurality of communication channels associated with the radio signal;
   identifying a first communication channel in the first plurality of communication channels that includes a first data bearing signal;
   receiving the first data bearing signal via the first communication channel;
   determining that the first communication channel is occupied based on a first measured characteristic for the first communication channel;
   selecting a second communication channel in the first plurality of communication channels that is not occupied based on the first measured characteristic for the second communication channel; and
   transmitting a first acknowledgement, via the second communication channel, that the first data bearing signal has been received.

2. The method of claim 1, further comprising demodulating the first data bearing signal into a first serial data stream.

3. The method of claim 2, further comprising extracting a first data packet from the first serial data stream that includes one or more data bits.

4. The method of claim 3, further comprising causing a processing unit to process the first data packet by routing the first data packet to a destination network port.

5. The method of claim 1, further comprising:
   identifying a third communication channel in the first plurality of communication channels that includes a second data bearing signal;
   receiving the second data bearing signal via the third communication channel;
   determining that the third communication channel is occupied based on energy measured for the third communication channel exceeding a threshold;
   selecting a fourth communication channel in the first plurality of communication channels that is not occupied based on energy measured for the fourth communication channel not exceeding the threshold; and
   transmitting a second acknowledgement, via the fourth communication channel, that the second data bearing signal has been received.

6. The method of claim 5, further comprising:
simultaneously demodulating the first data bearing signal into a first serial data stream and demodulating the second data bearing signal into a second serial data stream.

7. The method of claim 6, further comprising:
simultaneously extracting first data bits comprising a first data packet from the first serial data stream and extracting second data bits comprising a second data packet from the second serial data stream.

8. The method of claim 1, wherein a second plurality of communication channels over which a transceiver is permitted to transmit the first data bearing signal comprises a subset of the first plurality of communication channels.

9. The method of claim 1, further comprising selecting a center channel from the first plurality of communication channels during a discover protocol executed by a first transceiver and a second transceiver.

10. The method of claim 1, further comprising selecting a center channel from the first plurality of communication channels in response to a current transmission condition associated with at least one communications channel included in the first plurality of communication channels.

11. The method of claim 1, further comprising selecting a center channel from the first plurality of communication channels based on a predetermined frequency hop sequence.

12. A non-transitory computer-readable storage medium including instructions that, when executed by a processing unit, cause the processing unit to receive one or more data packets via a radio signal by:
monitoring a first plurality of communication channels associated with the radio signal;
identifying a first communication channel in the first plurality of communication channels that includes a first data bearing signal;
receiving the first data bearing signal via the first communication channel;
determining that the first communication channel is occupied based on energy measured for the first communication channel exceeding a threshold;
selecting a second communication channel in the first plurality of communication channels that is not occupied based on energy measured for the second communication channel not exceeding the threshold; and
transmitting a first acknowledgement, via the second communication channel, that the first data bearing signal has been received.

13. The non-transitory computer-readable storage medium of claim 12, further comprising demodulating the first data bearing signal into a first serial data stream.

14. The non-transitory computer-readable storage medium of claim 13, further comprising extracting a first data packet from the first serial data stream that includes one or more data bits.

15. The non-transitory computer-readable storage medium of claim 14, further comprising causing a processing unit to process the first data packet by routing the first data packet to a destination network port.

16. The non-transitory computer-readable storage medium of claim 12, further comprising:
identifying a third communication channel in the first plurality of communication channels that includes a second data bearing signal;
receiving the second data bearing signal via the third communication channel;
determining that the third communication channel is occupied based on energy measured for the third communication channel exceeding the threshold;
selecting a fourth communication channel in the first plurality of communication channels that is not occupied based on energy measured for the fourth communication channel not exceeding the threshold; and
transmitting a second acknowledgement, via the fourth communication channel, that the second data bearing signal has been received.

17. The non-transitory computer-readable storage medium of claim 16, further comprising:
simultaneously demodulating the first data bearing signal into a first serial data stream and demodulating the second data bearing signal into a second serial data stream.

18. The non-transitory computer-readable storage medium of claim 17, further comprising:
simultaneously extracting first data bits comprising a first data packet from the first serial data stream and extracting second data bits comprising a second data packet from the second serial data stream.

19. The non-transitory computer-readable storage medium of claim 12, wherein a second plurality of communication channels over which a transceiver is permitted to transmit the first data bearing signal comprises a subset of the first plurality of communication channels.

20. A wireless network device, comprising:
a radio transceiver circuit configured to generate a radio signal based on a carrier signal and a received signal; and
a signal processing unit that is coupled to the radio transceiver circuit and configured to:
monitor a first plurality of communication channels associated with the radio signal;
identify a first communication channel in the first plurality of communication channels that includes a first data bearing signal;
receive the first data bearing signal via the first communication channel;
determine that the first communication channel is occupied based on a first measured characteristic for the first communication channel;
select a second communication channel in the first plurality of communication channels that is not occupied based on the first measured characteristic for the second communication channel; and
transmit a first acknowledgement, via the second communication channel, that the first data bearing signal has been received.

* * * * *